United States Patent [19]

Toritani et al.

[11] Patent Number: 5,847,050
[45] Date of Patent: Dec. 8, 1998

[54] GRAFT POLYMER AND THERMOPLASTIC RESIN COMPOSITION

[75] Inventors: Akihiro Toritani; Koichi Shishido; Masahiro Osuka; Akira Nakata, all of Otake, Japan

[73] Assignee: Mitsubishi Rayon Co., Ltd., Tokyo, Japan

[21] Appl. No.: 793,449

[22] PCT Filed: Jul. 4, 1997

[86] PCT No.: PCT/JP96/01854

§ 371 Date: Mar. 3, 1997

§ 102(e) Date: Mar. 3, 1997

[87] PCT Pub. No.: WO97/02295

PCT Pub. Date: Jan. 23, 1997

[30] Foreign Application Priority Data

Jul. 4, 1995 [JP] Japan .................................. 7-168908

[51] Int. Cl.$^6$ ...................................................... C08L 51/04
[52] U.S. Cl. .............................. 525/84; 525/80; 525/86; 525/235; 525/239; 525/310; 525/316; 528/502 R
[58] Field of Search .................................. 525/80, 83, 84, 525/86, 310, 316, 235, 239

[56] References Cited

FOREIGN PATENT DOCUMENTS

| B-39-25183 | 11/1964 | Japan . |
|---|---|---|
| B-41-982 | 1/1966 | Japan . |
| 54-64583 | 5/1979 | Japan . |
| B-55-19246 | 5/1979 | Japan . |
| A-57-102940 | 6/1982 | Japan . |
| B-2-9601 | 12/1982 | Japan . |
| A-58-152039 | 9/1983 | Japan . |
| A-60-235854 | 11/1985 | Japan . |
| B-7-21012 | 5/1988 | Japan . |
| A-6-1815 | 1/1994 | Japan . |
| B-7-21014 | 3/1995 | Japan . |

*Primary Examiner*—Fred Teskin
*Attorney, Agent, or Firm*—Oblon, Spivak, McClelland, Maier & Neustadt, P.C.

[57] ABSTRACT

A method for particles agglomeration and enlargement of a diene type polymer rubber latex, which comprises subjecting a diene type polymer rubber latex produced by emulsion polymerization, to particles agglomeration and enlargement to obtain a particles-enlarged diene type polymer rubber latex (A), wherein the particles enlargement is allowed to take place by agglomeration based mainly on Brownian coagulation; a graft copolymer (B) of a particles-enlarged diene type polymer rubber latex (A) obtained by the above method; and a thermoplastic resin composition comprising said graft copolymer (B).

1 Claim, 6 Drawing Sheets

FIG.10

GRAFT POLYMER AND THERMOPLASTIC RESIN COMPOSITION

TECHNICAL FIELD

The present invention relates to a method for particles agglomeration and enlargement of a diene type polymer rubber latex; a graft copolymer obtained from the thus obtained particles-enlarged diene type polymer rubber latex; and a thermoplastic resin composition comprising such a graft copolymer.

BACKGROUND ART

Thermoplastic resins are in wide use in various fields for their excellent mechanical and chemical properties but generally have a drawback of low impact resistance. In order to alleviate the drawback, there were proposed methods for imparting impact resistance to a thermoplastic resin by adding thereto an impact resistance-improving resin such as an ABS resin which is a hard resin reinforced with an elastic body, an MBS resin and a graft polymer of a monomer (e.g. methyl methacrylate, styrene, acrylonitrile, etc.) on a poly (alkyl acrylate) rubber polymer (JP-A-57-102940, JP-A-60-235854 and JP-A-58-152039).

Graft copolymers of particles-enlarged rubber have been used for the impact resistance improvement of thermoplastic resin. With respect to the technique for obtaining this particles-enlarged rubber, there have been reported enlargement techniques using an electrolyte, a high-molecular organic acid latex, an acid or the like. A number of researches have been made particularly on an enlargement technique using an acid, and a method is well known which comprises adding an acid to a rubbery polymer latex to reduce the pH of the latex and agglomerate and enlarge the latex particles and then adding a basic substance to make the pH of the system alkaline and stabilize the latex.

In the above method, it is an important task to, at the time of particles agglomeration and enlargement, keep the stability of the latex and obtain a particles-enlarged latex without generating rubber coagulum.

As methods improved in the above important task, there were proposed a method which comprises adding an acid to a rubbery polymer latex, effecting particles enlargement at a pH of below 7.0, and then adding thereto a basic substance, these steps being conducted at a temperature of 40° C. or higher at an agitation intensity of not more than half that used during graft polymerization) (JP-B-55-19246); and a method which comprises adding an acid to a rubbery polymer latex containing a fatty acid soap and effecting particles enlargement at a pH of 4.0 or less, wherein the acid is added in a shower or fog state (JP-B-2-9601).

In JP-B-55-19246, while there is a description of the agitation intensity not more than half that used during graft polymerization, there is no description of specifying the level of the agitation intensity used during the graft polymerization; therefore, the agitation intensity to be employed during the particles enlargement is unknown. Further, while the agitation intensity is largely dependent upon the shape of the agitating element used, no description is made on the shape of agitating element even in Examples. Furthermore, in Examples, the solid content of the latex after particles enlargement is 25% by weight or less in all cases; such a method shown in Examples is applicable only to a latex of low solid content in which rubber coagulum are unlikely to appear. Therefore, the method described in the literature is unable to show high productivity.

The method described in JP-B-2-9601 is as well applicable only to a latex of low solid content (the solid contents of particles-enlarged latexes shown in Examples being 21–23% by weight). Therefore, this method is unable, either, to show high productivity. Further in this method, since the mixing of acid and latex is conducted by molecular diffusion without agitation, uniform agglomeration is unlikely to take place; even if any uniform agglomeration occurs at all, a considerably long time is required until it is over, making productivity low.

For obtaining a particles-enlarged latex of high solid content, there were proposed, for example, a method wherein, in the step of adding an acid to a polymer latex to give rise to agglomeration, the acid and the latex are continuously fed to a flow type tubular apparatus (JP-B-7-21014); and a method which comprises adding an emulsifier which is stable in an acidic state, to a polymer latex containing an emulsifier whose surface activity is reduced in an acidic state, then adding an excess amount of an acid, and adding the polymer latex further to give rise to particles enlargement (JP-B-7-21012).

In the method described in JP-B-7-21014, particles-enlarged latexes of high solid content (29–34.8% by weight) are obtained (Examples 1–3); however, a flow type tubular apparatus is needed besides an agitating vessel, which requires an additional facility investment and is not economical.

In the method described in JP-B-7-21012, a particles-enlarged latex of high solid content (40% by weight) is obtained in an agitating vessel.

In this method, however, the latex before particles enlargement has an average particle diameter of $0.185\mu$. In order to obtain a latex of such a large particle diameter, a very long polymerization time is needed (26 hours in Examples); therefore, the method has a productivity problem even prior to particles enlargement. The technique for obtaining a particles-enlarged latex is a technique for obtaining the large-particles latex which would require a very long time to obtain by emulsion polymerization, in a short time and is useful only when the technique can convert a small-particles latex which can be obtained by relatively short time polymerization, into a large-particles latex.

In other methods, it is necessary to allow the material latex to have sufficient stability. Otherwise, non-enlarged particles remain in the latex after particles enlargement, resulting in wide particle diameter distribution and insufficient impact resistance.

DISCLOSURE OF THE INVENTION

The present inventors made an intensive study in order to solve the above-mentioned problems. As a result, the present inventors found out a method for particles agglomeration and enlargement of a diene type polymer rubber latex, which comprises subjecting a diene type polymer rubber latex to particles enlargement by agglomeration based mainly on Brownian coagulation to form a particles-enlarged diene type polymer rubber latex of high solid content without generating rubber coagulum; a graft copolymer obtained from the thus-obtained particles-enlarged diene type polymer rubber latex; and a thermoplastic resin composition comprising such a graft copolymer, having excellent impact resistance. The present invention has been completed based on the finding.

The gist of the present invention lies in a method for particles agglomeration and enlargement of a diene type polymer rubber latex, which comprises subjecting a diene type polymer rubber latex produced by emulsion polymerization, to particles agglomeration and enlargement to obtain a particles-enlarged diene type polymer rubber latex (A), wherein the particles enlargement is allowed to take place by agglomeration based mainly on Brownian movement-induced agglomeration; a graft copolymer (B) of a particles-enlarged diene type polymer rubber latex (A) obtained by the above method; and a thermoplastic resin composition comprising said graft copolymer (B).

BEST MODE FOR CARRYING OUT THE PRESENT INVENTION

In the present invention, the Brownian coagulation refers to agglomeration of latex particles induced by their Brownian movement and consequent collision with each other. Agglomeration of latex is generally caused mainly by Brownian coagulation and shear agglomeration. Shear agglomeration refers to such a phenomenon that a latex receives a shear by agitation or the like and thereby flows and consequently the particles contained in the latex make a movement, collide with each other and resultantly cause agglomeration.

The present inventors found out that in subjecting a rubber latex to particles agglomeration and enlargement, as the contribution of the Brownian coagulation becomes large, rubber lumps are generated in a smaller amount and a particles-enlarged latex of higher stability can be obtained. A larger contribution of the Brownian coagulation can be obtained by reducing the shear applied to the material, and complete Brownian coagulation is attainable when no shear is applied. Though completely no rubber coagulum are formed when complete Brownian coagulation is effected, application of no shear results in requiring a very long time for mixing of latex and coagulant and invites reduced productivity.

Therefore, the object of the present invention is attained by effecting particles agglomeration and enlargement while promoting the mixing of coagulant by the application of a moderate shear to such an extent that no rubber coagulum are generated.

It was also found out that when particles agglomeration and enlargement is effected based mainly on the Brownian coagulation, particles enlargement under chemical stability becomes possible and, therefore, as compared with the case of the shear agglomeration wherein the agglomeration takes place by a dynamic factor such as collision, the particle diameter distribution of relatively uniform particle diameters is obtained and the amount of non-enlarged particles becomes very small.

Thus, in the present invention, particles agglomeration and enlargement of latex is effected based mainly on the Brownian coagulation with the shear agglomeration kept very low.

The diene type polymer rubber latex used in the present invention is obtained by ordinary emulsion polymerization. It includes, for example, a polybutadiene latex and a latex of a copolymer of 50% by weight or more of butadiene and a monomer copolymerizable with butadiene.

The monomer copolymerizable with butadiene includes aromatic vinyl type monomers such as styrene, α-methylstyrene and the like; alkyl (meth)acrylate type monomers such as methyl methacrylate, n-butyl acrylate and the like; and unsaturated nitrile type monomers such as acrylonitrile and the like. In the copolymerization, it is possible to further use, in combination, crosslinkable monomers such as divinylbenzene, ethylene glycol dimethacrylate, 1,3-butanediol diacrylate, allyl methacrylate and the like.

The monomers copolymerizable with butadiene and the crosslinkable monomers can be used singly or in admixture. In production of the diene type polymer, it is also possible to use as necessary, during the polymerization, a chain transfer agent such as t-dodecylmercaptan, n-octylmercaptan, a-methylstyrene dimer or the like.

The number-average particle diameter of the diene type polymer rubber latex is preferably 0.15 $\mu$m or less, more preferably 0.1 $\mu$m or less.

Even when the number-average particle diameter of the diene type polymer rubber latex is larger than 0.15 $\mu$m, there is no inconvenience in the agglomeration step. However, in obtaining, by emulsion polymerization, a diene type polymer rubber latex having a number-average particle diameter larger than 0.15 $\mu$m, a long time is required for polymerization, which reduces productivity of emulsion polymerization to show less improved productivity in the agglomeration step.

The solid content of the diene type polymer rubber latex after particles enlargement is preferred to be 30% by weight or more. Therefore, the solid content of the diene type polymer rubber latex is preferably 35% by weight or more, more preferably 40% by weight or more in view of the fact that the solid content is reduced by dilution during addition of aqueous acid solution and subsequent neutralization.

In the present invention, the solid content of the particles-enlarged diene type polymer rubber latex (A) is preferably 30% by weight or more, more preferably 35% by weight or more.

When the solid content of the particles-enlarged diene type polymer rubber latex (A) is less than the above range, productivity tends to be low.

The particles-enlarged diene type polymer rubber latex (A) used in the present invention can be obtained by subjecting the diene type polymer rubber latex to particles enlargement based mainly on the Brownian coagulation.

In the present invention, there is no particular restriction as to the apparatus, process, etc. used in the particles enlargement based mainly on the Brownian coagulation.

However, agitation in agitating vessel, for example, is conducted preferably at a number of rotations not larger than the rotational number (Ns) represented by the following expression (1):

$$Ns=(D0/Ds)k\times N0 \qquad (1)$$

wherein

Ds: diameter (mm) of agitating element

Ns: maximum allowable number of rotations (rpm) in particles agglomeration and enlargement step k, D0 and N0: the following constants determined by the shape of agitating element:

propeller type agitating element: k=0.60, N0=450, D0=60 sweptback type agitating element: k=0.46, N0=300, D0=60 paddle type agitating element: k=0.50, N0=270, D0=70 large-sized plate type agitating element: k=0.55, N0=200, D0=80

Using the above formula (1), the maximum allowable number of rotations [Ns (rpm)] in the particles agglomeration step can be determined depending upon the diameter and type of the agitating element used. When agitation is made at a rotational number larger than Ns (rpm), rubber lumps are generated in some cases and reduction in productivity may be caused.

Figure 1:
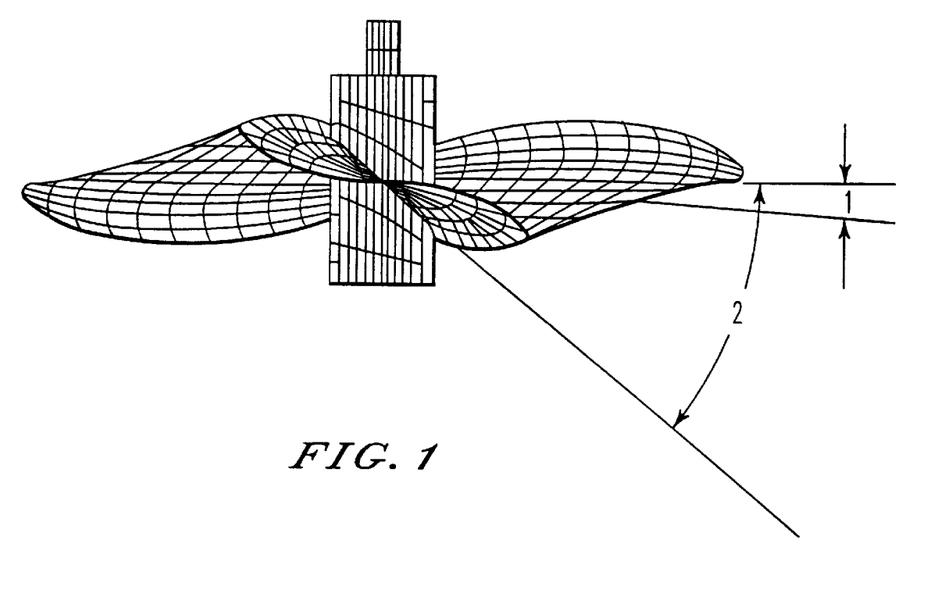
FIG. 1 is a side view of a propeller type agitating element used in the present invention.
Figure 2:
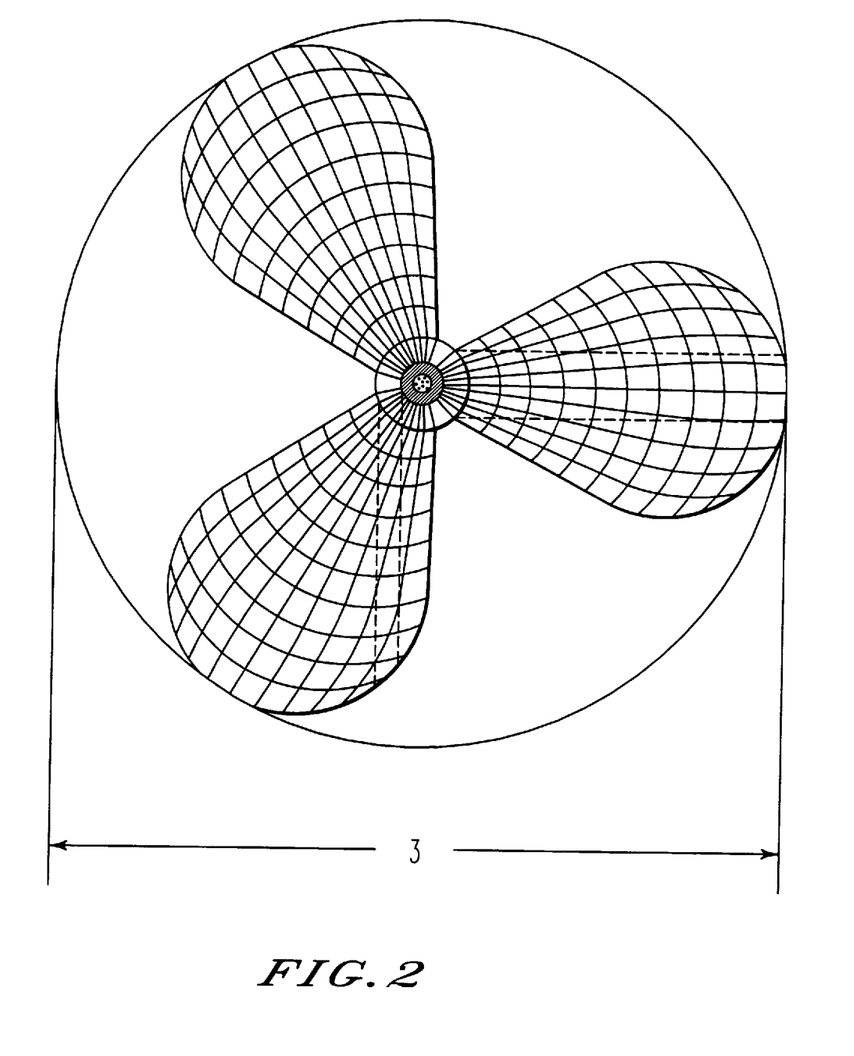
FIG. 2 is a top view of a propeller type agitating element used in the present invention.

The propeller type agitating element referred to in the present invention is an agitating element as shown in FIG. 1 and FIG. 2 and has no particular restriction as to the shape. However, it preferably has 3–4 blades, an angle of each blade at the root (an angle indicated by 1 in FIG. 1) of 0°–50°, and the maximum inclination angle of each blade (an angle indicated by 2 in FIG. 1) of 30°–75°.

Figure 3:
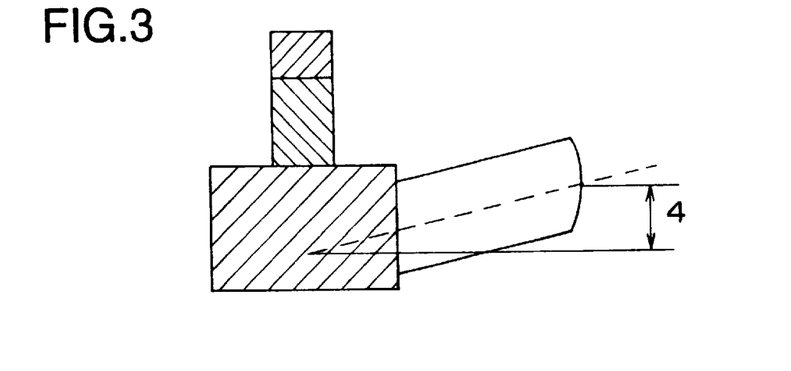
FIG. 3 is a side view of a sweptback type agitating element used in the present invention.
Figure 4:
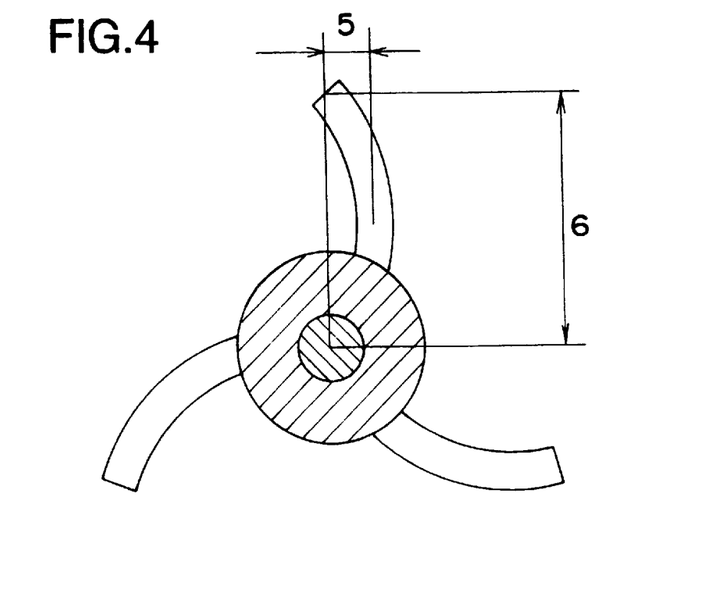
FIG. 4 is a top view of a sweptback type agitating element used in the present invention.
Figure 5:
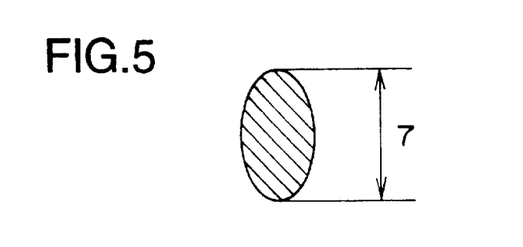
FIG. 5 is a sectional view of a sweptback type agitating element used in the present invention.

The sweptback type agitating element mentioned above is an agitating element typified by a three-way sweptback agitating element shown in FIG. 3 and FIG. 4 and has no particular restriction as to the shape. However, it preferably has 3–4 blades, a sweepback length (a length indicated by 5 in FIG. 4) of 0.05–0.3 time the element diameter (2 times the length indicated by 6 in FIG. 4), an element end height (a length indicated by 4 in FIG. 3) of 0.01–0.2 time the element diameter (2 times the length indicated by 6 in FIG. 4), and a blade height (a length indicated by 7 in FIG. 5) of 0.1–0.5 time the element diameter (2 times the length indicated by 6 in FIG. 4).

Figure 6:
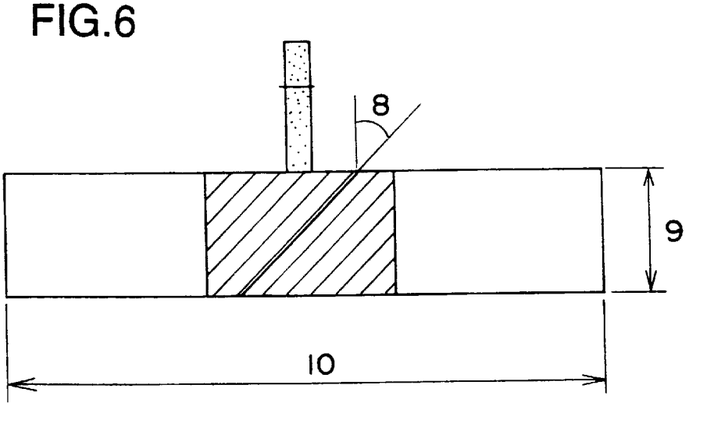
FIG. 6 is a side view of a paddle type agitating element used in the present invention.
Figure 7:
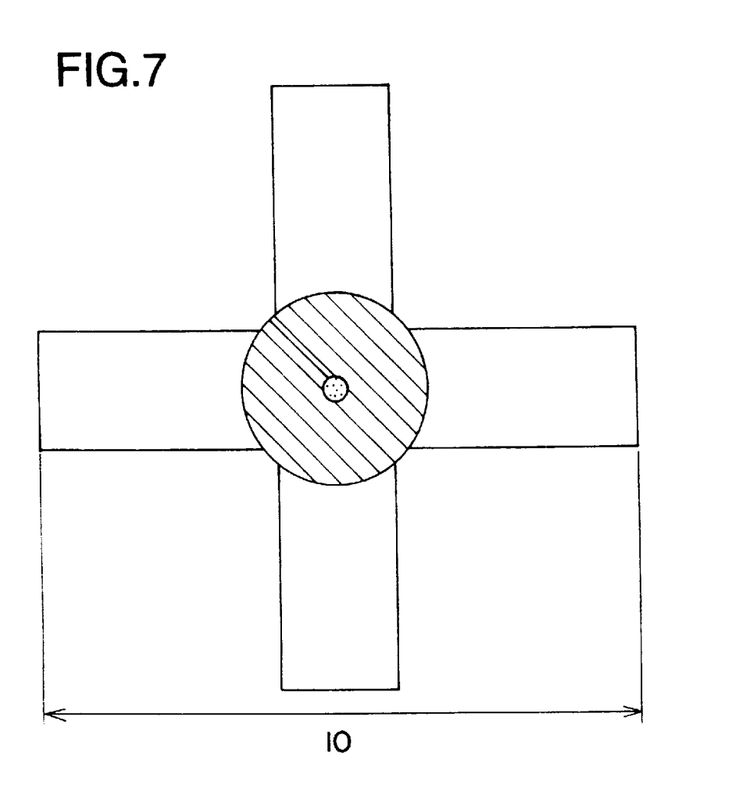
FIG. 7 is a top view of a paddle type agitating element used in the present invention.

The paddle type agitating element mentioned above is an agitating element as shown in FIG. 6 and FIG. 7 and has no particular restriction as to the shape. However, it preferably has 2–6 blades, an inclination angle (an angle indicated by 8 in FIG. 6) of 0°–45°, and a blade height (a length indicated by 9 in FIG. 6) of 0.1–0.5 time the element diameter 10.

Figure 8:
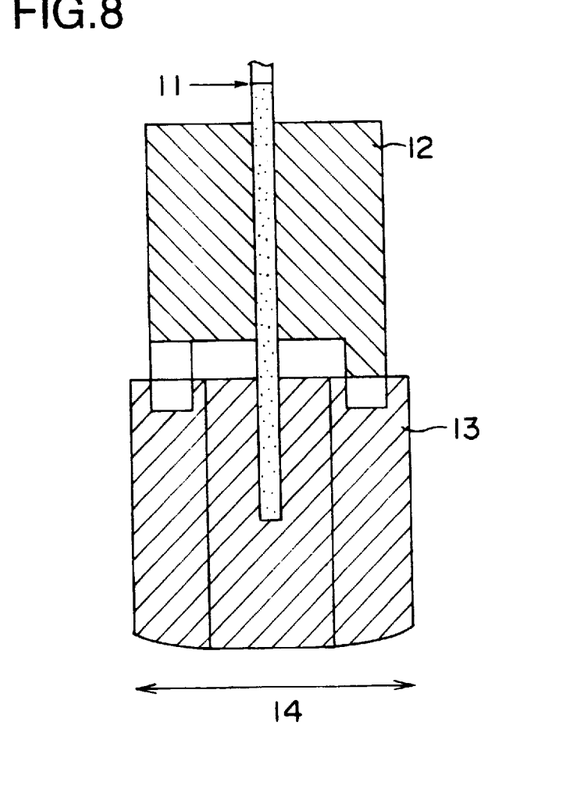
FIG. 8 is a side view of a large-sized plate type agitating element (a FULLZONE type agitating element) used in the present invention.
Figure 9:
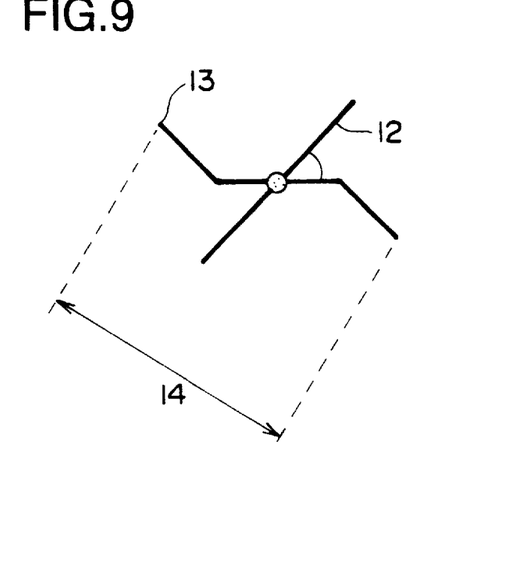
FIG. 9 is a top view of a large-sized plate type agitating element (a FULLZONE type agitating element) used in the present invention.
Figure 10:
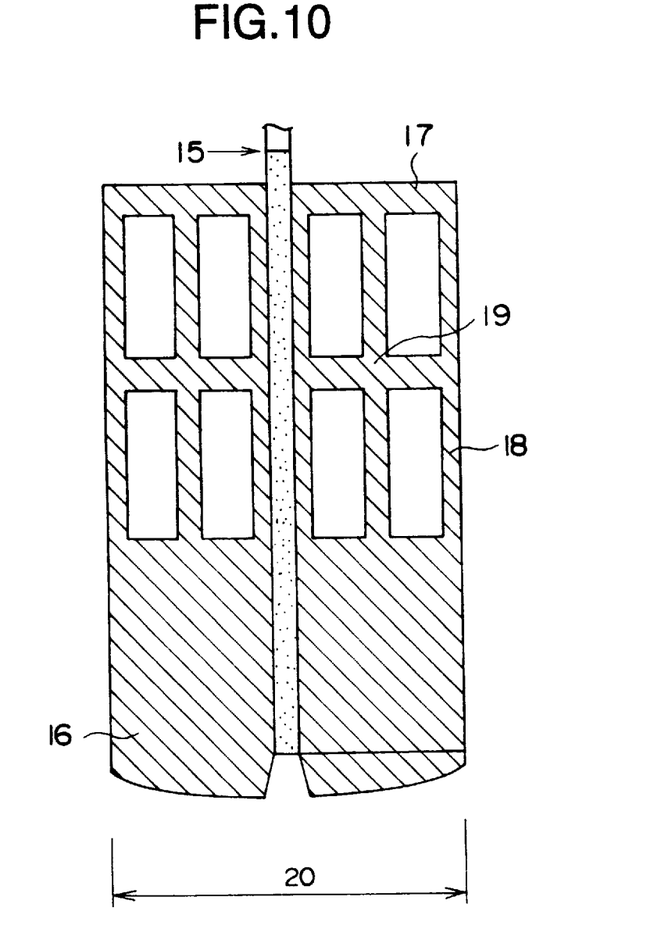
FIG. 10 is a side view of a large-sized plate type agitating element (a MAXBLEND type agitating element) used in the present invention.

The large-sized plate type agitating element mentioned above is, for example, an agitating element typified by a FULLZONE agitating element (produced by Shinko Pantec Co., Ltd.) shown in FIG. 8 and FIG. 9, i.e. an agitating element having a lowermost radical blade 13 fixed to the rotational shaft 11 in the vicinity of the bottom of an agitating vessel and at least one step of upper radical blade 12 fixed to the rotational shaft 11 with its phase shifted, relative to the adjacent lower blade, by 90° or less in the rotational direction, wherein the edge portions in the radial direction of the opposing blade ends of the upper and lower adjacent blades overlap each other in the vertical direction; or an agitating element typified by MAXBLEND (produced by SUMITOMO HEAVY INDUSTRIES, LTD.) shown in FIG. 10, i.e. an agitating element comprising a paddle 16 for agitating the bottom of an agitating vessel, fixed to the lower portion of the rotational shaft 15 and a lattice blade 19 fixed to the upper portion of the rotational shaft 15, consisting of horizontal members 17 extending horizontally from the rotational shaft 15 and members 18 extending perpendicularly from the horizontal members.

The size (14 in FIG. 8 and FIG. 9 and 20 in FIG. 10) of the agitating element can be determined appropriately depending upon the size of the agitating vessel but is preferably 0.3–0.8 time the diameter of the agitating vessel.

Use of a baffle, eccentric agitation or the like is possible for promotion of mixing of aqueous flocculent solution, unless rubber lumps are generated.

When a baffle(s) is provided, it is preferable that the number of baffles is four or less and that the lower ends of the baffles are located above the upper end of the agitating element. When the eccentric agitation is made, it is preferable that the horizontal distance from the center of the agitating vessel to the center of the agitating shaft is not more than 0.2 time the diameter of the agitating vessel.

In the present invention, there is no particular restriction as to the agitation time in the flocculation step. However, the agitation time is preferred to be as short as possible as long as complete mixing of aqueous flocculent solution is achieved, and is preferably 60 minutes or less, more preferably 20 minutes or less.

In the present invention, the diene type polymer rubber latex is obtained by emulsion polymerization using a fatty acid soap as an emulsifier, and the particles agglomeration and enlargement of the diene type polymer rubber latex is preferably effected by adding to the latex an emulsifier which has good surface activity in an acidic state, then adding a coagulant to reduce the pH to 5 or below, and adding a basic substance for neutralization.

There is no particular restriction as to the type of the fatty acid soap used as an emulsifier. The fatty acid soap includes, for example, sodium salt of mixed fatty acids, potassium salt of mixed fatty acids, sodium oleate, potassium oleate, sodium stearate, potassium stearate and disproportionated potassium rosinate. These fatty acid soaps can be used singly or in admixture.

There is no particular restriction as to the amount of the fatty acid soap added, and the amount is sufficient if it can keep the stability of latex in emulsion polymerization. The amount is generally 0.5–5 parts by weight per 100 parts by weight of the monomers of diene type polymer.

There is no particular restriction as to the type of the emulsifier having good surface activity in an acidic state, used in the particles agglomeration and enlargement step. The emulsifier, however, is preferably an emulsifier having a sulfonic acid group and an alkali metal salt, such as sodium alkylbenzenesulfonate, polyoxyethylene alkyl ether sulfate, sodium alkyl diphenyl ether disulfonate, sodium alkylnaphthalenesulfonate, sodium dialkylsulfosuccinate or the like. These emulsifiers can be used singly or in admixture.

The added amount of the emulsifier having good surface activity in an acidic state is 0.01–0.5 part by weight, preferably 0.1–0.3 part by weight per 100 parts by weight (as solid content) of the diene type polymer latex.

When the amount of the emulsifier added is less than 0.01 part by weight, a large amount of rubber coagulum may be formed by addition of a coagulant. When the amount is more than 0.5 part by weight, the particles enlargement of diene type polymer rubber latex by addition of a coagulant becomes less.

The timing of addition of the emulsifier showing no reduction in surface activity in an acidic state can be any timing as long as it is prior to particles enlargement.

In the present invention, the coagulant used is preferably an aqueous acid solution. It is added in such an amount that the system pH becomes 5 or less. When the amount of the aqueous coagulant solution is small and the system pH is higher than 5 after coagulant addition, no sufficient particles enlargement is obtained. As to the aqueous acid solution used as the coagulant, there is no particular restriction and there can be used inorganic acids such as sulfuric acid, hydrochloric acid, phosphoric acid and the like, and organic acids such as acetic acid, formic acid, lactic acid, acrylic acid, methacrylic acid and the like.

The concentration of the aqueous coagulant solution is desirably as high as possible from the standpoint of productivity as long as no rubber coagulum are generated during coagulant addition. However, since the acidity of coagulant varies depending upon the kind thereof, the concentration of coagulant must be determined depending upon the kind of acid used. For example, the coagulant concentration is 0.3–10% by weight, preferably 0.5–5% by weight in the case of an aqueous sulfuric acid solution, and 3–40% by weight, preferably 5–20% by weight in the case of an aqueous acetic acid solution.

There is no particular restriction as to the addition method of the aqueous coagulant solution. However, it is preferable to slowly add an aqueous acid solution to a diene type polymer rubber latex while stirring the latex in an agitating vessel. Preferably, the aqueous acid solution is slowly injected into the latex from one or more nozzles dipped in the latex, or is slowly injected into the latex from an outlet provided at the bottom of the agitating vessel.

In the present invention, there is no particular restriction as to the type of the basic substance used for neutralization. However, the basic substance is preferably sodium hydroxide, potassium hydroxide, sodium carbonate, potassium carbonate or the like. An aqueous sodium or potassium hydroxide is more preferred. No rubber coagulum are formed even when the aqueous basic substance solution has a high concentration. However, when the solution has a low concentration, the volume of the resulting system is large and the solid content of the final polymer latex is low, which is not preferable. The concentration of the aqueous basic substance solution is preferably 5–60% by weight, in general.

In the present invention, the temperature of the system in which the particles agglomeration step is conducted, is not particularly restricted but is preferably 10°–60° C.

In the present invention, the average particle diameter of the particles-enlarged diene type polymer rubber latex (A) can be optionally controlled by varying, for example, the amount of the acid added and the amount added of the emulsifier having good surface activity in an acidic state, as long as the pH after particles enlargement becomes 7 or less, preferably 5 or less. When the particles-enlarged diene type polymer rubber latex is used as an impact resistance improving agent for thermoplastic resin, the number-average particle diameter of the latex is preferably 0.15–0.5 µm and the proportion of the particles having particles diameters of smaller than 0.15 µm is preferably 10% by weight or less.

The graft copolymer (B) of the present invention is obtained by graft-polymerizing, onto the particles-enlarged diene type polymer rubber latex (A) obtained by agglomeration based mainly on the Brownian coagulation, at least one monomer selected from the group consisting of an aromatic vinyl type monomer, a (meth)acrylic acid ester type monomer, an unsaturated nitrile type monomer and a monomer copolymerizable therewith, in one or more stages.

The content of the particles-enlarged diene type polymer rubber latex (A) in the graft copolymer (B) is preferably 55–85% by weight in terms of solid content. When the content is less than 55% by weight, no sufficient impact resistance is exhibited; when the content is more than 85% by weight, the other excellent properties of the thermoplastic resin (C) tend to be impaired; therefore, such contents are not preferable.

The aromatic vinyl type monomers graft-polymerized include styrene, α-methylstyrene, halogen-substituted or alkyl-substituted styrenes, etc. The (meth)acrylic acid ester type monomers graft-polymerized include methacrylic acid esters such as methyl methacrylate, ethyl methacrylate, propyl methacrylate, glycidyl methacrylate and the like; and acrylic acid esters such as methyl acrylate, ethyl acrylate, butyl acrylate, glycidyl acrylate and the like. The unsaturated nitrile type monomers graft-polymerized include acrylonitrile, methacrylonitrile, etc. The monomers copolymerizable therewith, used for graft polymerization include aromatic polyfunctional vinyl compounds such as divinylbenzene, divinyltoluene and the like; polyhydric alcohol dimethacrylates such as ethylene glycol dimethacrylate, 1,3-butanediol diacrylate and the like; poly (meth)acrylic acid esters such as trimethacrylic acid ester, triacrylic acid ester and the like; allyl carboxylates such as allyl acrylate, allyl methacrylate and the like; di- and tri-allyl compounds such as diallyl phthalate, diallyl sebacate, triallyltriazine and the like; allyl glycidyl ether; and so forth.

When the graft copolymer (B) is mixed into a vinyl chloride resin, methyl methacrylate is used as the monomer to be graft-polymerized in production of the graft copolymer (B), so that the resulting graft copolymer (B) can have improved impact resistance and higher compatibility with the vinyl chloride resin. As necessary, a vinyl type monomer copolymerizable with methyl methacrylate may be used in combination therewith.

The graft polymerization is preferably conducted in three stages. In the first stage, methyl methacrylate is used as a main component for higher impact resistance and higher compatibility with vinyl chloride resin. In the second stage, styrene is used as a main component for higher fluidity of graft copolymer. In the third stage, methyl methacrylate is used as a main component for higher surface luster of thermoplastic resin composition obtained.

The monomers used for graft polymerization can be used singly or in admixture.

The graft polymerization can be conducted by ordinary emulsion polymerization as in the case of rubber production. The polymerization temperature varies depending upon the kind of the polymerization initiator used but can be appropriately selected in a range of about 40°–80° C.

The graft copolymer latex (B) obtained is subjected to the coagulation using an appropriate coagulant such as acid (e.g. sulfuric acid, hydrochloric acid or phosphoric acid), salt (e.g. calcium chloride or sodium chloride) or the like, wherein an appropriate antioxidant, appropriate additives, etc. may or may not be used, and then to a heat treatment for solidification. The resulting solid is dehydrated, washed and dried to obtain a graft copolymer (B) in a powdery state.

To the graft copolymer (B) may be added a stabilizer such as epoxidized soybean oil, 1,4-dihydro-2,6-dimethyl-3,5-dicarbododecyloxypyridine or the like in order to improve the heat-coloring property of the graft copolymer (B). Also, a silica powder or the like may be added in order to improve the handleability of the powdery graft copolymer (B).

By mixing 1–30% by weight of the graft copolymer (B) obtained in the present invention, with 99–70% by weight of a thermoplastic resin (C), a thermoplastic resin composition having excellent impact resistance can be obtained. When the proportion of the graft copolymer (B) is less than 1% by weight, substantially no addition effect of the graft copolymer (B) is obtained; when the proportion of the graft copolymer (B) is more than 30% by weight, the other excellent properties of the thermoplastic resin (C) tend to be impaired; therefore, such proportions are not preferable.

There is no particular restriction as to the kind of the thermoplastic resin (C). When a polyvinyl chloride type resin is used as the thermoplastic resin (C), however, there can be used, for example, a chlorine-containing resin such as polyvinyl chloride, chlorinated polyvinyl chloride or the like; or a copolymer of 70% by weight or more of vinyl chloride and 30% by weight or less of other monomer copolymerizable therewith. The other monomer copolymerizable with vinyl chloride includes vinyl bromide, vinylidene chloride, vinyl acetate, acrylic acid, methacrylic acid, ethylene, etc.

The thermoplastic resin composition of the present invention can be obtained by mixing the graft copolymer (B) and the thermoplastic resin (C) in a powdery state by the use of a ribbon blender, a Henschel mixer or the like and then treating the mixture in a known kneader, a known extruder or the like. In an alternative method, the thermoplastic resin (C) and the graft copolymer (B) may be subjected to mixing, coagulation, solidification, washing, drying, etc. to obtain a powder. In any of these mixing methods, a known stabilizer, a known plasticizer, a known processing aid, a known coloring agent, etc. may be added as necessary.

The present invention is hereinafter described in detail by way of Examples. However, the present invention is not restricted to the following Examples as long as the gist of the present invention is observed. Incidentally, "part(s)" and "%" used in Examples and Comparative Examples refer to "part(s) by weight" and "% by weight", respectively.

In the following Examples and Comparative Examples, properties were measured by the following methods.

Number-average particle diameter and particle diameter distribution

Number-average particle diameter was measured by kneading a sample at 185° C. using a 6-inch roll, press-molding the kneaded product at 185° C. at 50 kg/cm², and subjecting the molding to image analysis using TEM. Particle diameter distribution was expressed as weight percentage of non-enlarged small particles.

Scale (coagulum) after enlargement

The amount of scale (coagulum) after enlargement was expressed as weight percentage after drying of generated scale based on fed monomers.

Izod impact strength

A sample was kneaded at 185° C. using a 6-inch roll; the kneaded product was press-molded at 185° C. at 50 kg/cm²; and the molding was measured according to ASTM D 256.

Luster of molded product

A film having a thickness of 0.1 mm, obtained using a 30-mm single screw extruder was observed visually.

o: Good

Δ: Cloudy

X: No luster

EXAMPLES AND COMPARATIVE EXAMPLES (i) Production of diene type polymer rubber latexes

[a]–[c]

[a]

| 1,3-Butadiene | 75 parts |
| Styrene | 25 parts |
| t-Dodecylmercaptan | 0.3 part |
| Diisopropylbenzene hydroperoxide | 0.4 part |
| Sodium pyrophosphate | 1.5 parts |
| Ferrous sulfate | 0.02 part |
| Dextrose | 1 part |
| Potassium oleate | 1.5 parts |
| Deionized water | 150 parts |

The above components of the above amounts were fed into a pressure autoclave and were subjected to a reaction at 60° C. for 8 hours with stirring, whereby a diene type polymer rubber latex was produced.

The resulting diene type polymer rubber latex had a number-average particle diameter of 0.09 μm, a solid content of 40% and pH 9.0.

[b]

| 1,3-Butadiene | 70 parts |
| Styrene | 30 parts |
| 1,3-Butylene glycol dimethacrylate | 1.0 part |
| Diisopropylbenzene hydroperoxide | 0.4 part |
| Sodium pyrophosphate | 1.5 parts |
| Ferrous sulfate | 0.02 part |
| Dextrose | 1 part |
| Potassium salt of beef tallow acid | 1.5 parts |
| Deionized water | 180 parts |

The above components of the above amounts were fed into a pressure autoclave and were subjected to a reaction at 60° C. for 8 hours with stirring, whereby a diene type polymer rubber latex was produced.

The diene type polymer rubber latex had a number-average particle diameter of 0.09 μm, a solid content of 36% and pH 9.1.

[c]

| 1,3-Butadiene | 100 parts |
| t-Dodecylmercaptan | 0.6 part |
| Diisopropylbenzene hydroperoxide | 0.4 part |
| Sodium pyrophosphate | 1.5 parts |
| Ferrous sulfate | 0.02 part |
| Dextrose | 1 part |
| Sodium salt of beef tallow acid | 1.5 parts |
| Deionized water | 170 parts |

The above components of the above amounts were fed into a pressure autoclave and were subjected to a reaction at 60° C. for 8 hours with stirring, whereby a diene type polymer rubber latex was produced.

The resulting diene type polymer rubber latex had a number-average particle diameter of 0.08 μm, a solid content of 37% and pH 9.1.

(ii) Preparation of agitating vessels

[Condition 1]

An agitating element was provided in a 65-liter agitating vessel (inner diameter: 400 mm, height: 650 mm, SUS-made; no baffle) so that the center of the agitating element was at a position of the central axis of the agitating vessel, which was 45 mm above the bottom surface of the vessel. The agitating element was a propeller type agitating element having 3 blades, an angle of each blade at the root (an angle indicated by 1 in FIG. 1), of 45°, the maximum inclination angle of each blade (an angle indicated by 2 in FIG. 1), of 45°, and a diameter of 180 mm.

[Condition 2]

This condition was the same as [condition 1] except that the agitating element used in [condition 1] was changed to a paddle type agitating element having 6 blades, an inclination angle (an angle indicated by 8 in FIG. 6) of 0°, a blade height (a length indicated by 9 in FIG. 6) of 30 mm, and a diameter of 210 mm.

[Condition 3]

This condition was the same as [condition 1] except that the agitating element used in [condition 1] was changed to a three-way sweptback type agitating element having 3 blades, a sweepback length (a length indicated by 5 in FIG. 4) of 20 mm, an element end height (a length indicated by 4 in FIG. 3) of 10 mm, a blade height (a length indicated by 7 in FIG. 5) of 30 mm, and a diameter of 180 mm.

[Condition 4]

An agitating element was provided in a 2.5-liter agitating vessel (inner diameter: 135 mm, height: 200 mm, glass-made; no baffle) so that the center of the agitating element was at a position of the central axis of the agitating vessel, which was 15 mm above the bottom surface of the vessel. The agitating element was a propeller type agitating element having 3 blades, an angle of each blade at the root (an angle indicated by 1 in FIG. 1), of 45°, the maximum inclination angle of each blade (an angle indicated by 2 in FIG. 1), of 45°, and a diameter of 60 mm.

[Condition 5]

This condition was the same as [condition 4] except that the agitating element used in [condition 4] was changed to a paddle type agitating element having 6 blades, an inclination angle (an angle indicated by 8 in FIG. 6) of 0°, a blade height (a length indicated by 9 in FIG. 6) of 10 mm, and a diameter of 70 mm.

[Condition 6]

This condition was the same as [condition 4] except that the agitating element used in [condition 4] was changed to a three-way sweptback type agitating element having 3 blades, a sweepback length (a length indicated by 5 in FIG. 4) of 3.5 mm, an element end height (a length indicated by 4 in FIG. 3) of 30 mm, a blade height (a length indicated by 7 in FIG. 5) of 10 mm, and a diameter of 60 mm.

[Condition 7]

This condition was the same as [condition 4] except that the agitating element used in [condition 4] was changed to a paddle type agitating element having 4 blades, an inclination angle (an angle indicated by 8 in FIG. 6) of 45°, a blade height (a length indicated by 9 in FIG. 6) of 10 mm, and a diameter of 70 mm.

[Condition 8]

This condition was the same as [condition 4] except that the agitating element used in [condition 4] was changed to a FULLZONE type agitating element having two blades (a lower blade having a diameter of 81 mm and an upper blade having a diameter of 74 mm) having a phase shift of 45° between the upper and lower steps and a height from the upper end of the upper blade to the lower end of the lower blade of 100 mm.

[Condition 9]

This condition was the same as [condition 4] except that the agitating element used in [condition 4] was changed to a MAXBLEND type agitating element comprising a paddle (diameter: 80 mm, height: 40 mm) for agitation of the bottom of agitating vessel, fixed to the lower portion of the rotational shaft and a lattice blade consisting of two horizontal members (diameter: 80 mm, height: 10 mm) extending horizontally from the upper positions of the rotational shaft (which were 25 mm and 50 mm above from the upper end of the paddle) and four members (width: 10 mm, height: 50 mm) extending vertically from the positions of the upper horizontal member (which were 40 mm and 80 mm distant from the rotational shaft).

[Condition 10]

This condition was the same as [condition 3]. (iii) Particles enlargement of diene type polymer rubber latexes

[Conditions 1–3]

Into one of the agitating vessels prepared in the above (ii) were fed 27 kg of one of the diene type polymer rubber latexes obtained in the above (i) and a 10% aqueous solution of an emulsifier having good surface activity in an acidic state, as shown in Table 1 (In Table 1 is shown the amount (part) of each emulsifier used per 100 parts of each diene type polymer rubber latex). Then, sufficient agitation was made slowly.

Then, the number of rotations of the agitating element was set as shown in Table 1; a L-shaped nozzle (inner diameter: 10 mm) was fixed to the agitating vessel so that the direction of the nozzle outlet became the same as the rotational direction of the agitating element, i.e. the circumferential direction of the agitating vessel; from the L-shaped nozzle was injected, into the latex in 7 minutes, an aqueous acid solution (the concentration and amount thereof are shown in Table 1, the concentration is shown by % by weight, the amount is shown by part(s) per 100 parts of the diene type polymer rubber latex). Thereafter, agitation was continued for 10 minutes. The pH of the system is shown in Table 1.

Next, an aqueous alkali solution (the concentration and amount thereof are shown in Table 1, the concentration is shown by % by weight, the amount is shown by part(s) per 100 parts of the diene type polymer rubber latex) was added to complete a particles-enlargement operation. The solid content, number-average particle diameter and pH of the particles-flocculated-and-enlarged diene type polymer rubber latex obtained and the amount of rubber coagulum (scale) generated are shown in Table 1.

[Conditions 4–9]

Into one of the agitating vessels prepared in the above (ii) were fed 1,000 g of one of the diene type polymer rubber latexes obtained in the above (i) and a 10% aqueous solution of an emulsifier having good surface activity in an acidic state, as shown in Table 1 (In Table 1 is shown the amount (part) of each emulsifier used per 100 parts of each diene type polymer rubber latex). Then, sufficient agitation was made slowly.

Then, the number of rotations of the agitating element was set as shown in Table 1; a L-shaped nozzle (inner diameter: 4 mm) was fixed to the agitating vessel so that the direction of the nozzle outlet became the same as the rotational direction of the agitating element, i.e. the circumferential direction of the agitating vessel; from the L-shaped nozzle was injected, into the latex in 7 minutes, an aqueous acid solution (the concentration and amount thereof are shown in Table 1, the concentration is shown by % by weight, the amount is shown by part(s) per 100 parts of the diene type polymer rubber latex). Thereafter, agitation was continued for 10 minutes. The pH of the system is shown in Table 1.

Next, an aqueous alkali solution (the concentration and amount thereof are shown in Table 1, the concentration is shown by % by weight, the amount is shown by part(s) per 100 parts of the diene type polymer rubber latex) was added to complete a particles-enlargement operation. The solid content, number-average particle diameter and pH of the particles-flocculated-and-enlarged diene type polymer rubber latex obtained and the amount of rubber coagulum (scale) generated are shown in Table 1.

[Condition 10]

Into one of the agitating vessels prepared in the above (ii) were fed 27 kg of one of the diene type polymer rubber latexes obtained in the above (i) and a 10% aqueous solution of an emulsifier having good surface activity in an acidic state, as shown in Table 1 (In Table 1 is shown the amount (part) of each emulsifier used per 100 parts of each diene type polymer rubber latex). Then, sufficient agitation was made slowly.

Then, the number of rotations of the agitating element was set as shown in Table 1; a L-shaped nozzle (inner diameter: 10 mm) was fixed to the agitating vessel so that the direction of the nozzle outlet became the same as the rotational direction of the agitating element, i.e. the circumferential direction of the agitating vessel; from the L-shaped nozzle was injected, into the latex in 2 minutes, ¼ of an aqueous acid solution (the concentration and amount thereof are shown in Table 1, the concentration is shown by % by weight, the amount is shown by part(s) per 100 parts of the diene type polymer rubber latex). Next, ¼ of an aqueous alkali solution (the concentration and amount thereof are shown in Table 1, the concentration is shown by % by weight, the amount is shown by part(s) per 100 parts of the diene type polymer rubber latex) was added, followed by agitation of 2 minutes. Acid addition and alkali addition was repeated 4 times to complete a particles-enlargement operation.

The solid content, number-average particle diameter and pH of the particles-flocculated-and-enlarged diene type polymer rubber latex obtained and the amount of rubber coagulum (scale) generated are shown in Table 1.

(iv) Synthesis of graft copolymers (B)

One of the particles-agglomerated-and-enlarged diene type polymer rubber latexes obtained above was fed into a flask in an amount shown (as solid content) in Table 2, after which purging with nitrogen was conducted. Thereto was added 1.5 parts of the same emulsifier as used in production of rubber, as a 7% aqueous solution for latex stabilization. Then, 0.6 part of Rongalit was added and the flask inside temperature was kept at 70° C. Thereto was dropwise added, in 1 hour, a mixture of a monomer or monomer mixture for first stage grafting in of an amount as shown in Table 2 and 0.2 part, per 100 parts of the monomer or monomer mixture, of cumene hydroperoxide (CHP). The resulting mixture was allowed to stand for 1 hour.

Thereafter, to the polymer obtained in the previous stage was dropwise added, in 1 hour, a mixture of a monomer or monomer mixture for second stage grafting in an amount as shown in Table 2 and 0.2 part, per 100 parts of the monomer or monomer mixture, of CHP. The resulting mixture was allowed to stand for 1 hour.

To the polymers obtained in the first and second stages was then dropwise added, in 1 hour, a mixture of a monomer or monomer mixture for third stage grafting in an amount as shown in Table 2 and 0.2 part, per 100 parts of the monomer or monomer mixture, of CHP. The resulting mixture was allowed to stand for 1 hour, whereby polymerization was completed.

To 100 parts by weight of the graft copolymer latex obtained above was added 0.5 part of 1,4-dihydro-2,6-dimethyl-3,5-dicarbododecyloxypyridine (DHP). Then, a 0.2% aqueous sulfuric acid solution was added in 2 parts (as pure sulfuric acid) per 100 parts by weight of the graft copolymer to coagulate the latex (when no complete coagulation occurred, a 5% aqueous sodium chloride solution was added as necessary), followed by heat treatment at 90° C. for solidification. The resulting coagulum was washed with hot water and dried to obtain each graft copolymer powder.

(v) Preparation of thermoplastic resin compositions

The following components were mixed in a Henschel mixer for 10 minutes until 110° C. was reached, whereby various polyvinyl chloride type resin compositions were obtained: 100 parts of a polyvinyl chloride type resin (average polymerization degree: 700) as a thermoplastic resin, 3 parts of dioctyltin mercaptide, 2 parts of Metablen P-550 (trademark) (a product of Mitsubishi Rayon Co., Ltd.) and 1 part of Metablen P-710 (trademark) (a product of Mitsubishi Rayon Co., Ltd.), used as a stabilizer and a lubricant, the graft copolymer resins (B) powder obtained in the above (3).

Each resin composition was molded to obtain each molded product, that was measured for impact resistance and luster. The results are shown in Table 2.

Industrial Applicability

The particles flocculation and enlargement method of the present invention has made it possible to produce, from a rubber latex in a conventional agitating vessel, a particles-enlarged rubber latex having intended particle diameters, at high productivity without generating substantially any rubber lumps; to produce a graft copolymer by subjecting the particles-enlarged rubber latex to graft polymerization; and to obtain a thermoplastic resin composition of excellent impact resistance by using the graft copolymer.

TABLE 1

| | | | | Dispersion stabilizer | | Conditions for particle enlargement | | | Coagulant | |
|---|---|---|---|---|---|---|---|---|---|---|
| | Particles-enlarged latex | Rubber latex | Emulsifier kind | Kind | Amount/part | Type | Ns | Number of rotations/rpm | Kind | Concentration/% |
| Example | A-1 | a | OL-K | RDDSN | 0.2 | condition 1 | 233 | 200 | phosphoric acid | 5 |
| | A-2 | a | OL-K | RDDSN | 0.2 | condition 2 | 156 | 140 | phosphoric acid | 5 |
| | A-3 | a | OL-K | RDDSN | 0.2 | condition 3 | 180 | 160 | phosphoric acid | 5 |
| | A-4 | a | OL-K | RDDSN | 0.2 | condition 4 | 450 | 300 | phosphoric acid | 5 |
| | A-5 | a | OL-K | RDDSN | 0.2 | condi- | 270 | 200 | phosphoric | 5 |

TABLE 1-continued

|  |  |  |  |  |  |  |  |  |  |  |
|---|---|---|---|---|---|---|---|---|---|---|
|  | A-6 | a | OL-K | RDDSN | 0.2 | condition 5 | 300 | 230 | phosphoric acid | 5 |
|  | A-7 | a | OL-K | RDDSN | 0.2 | condition 6 | 270 | 230 | phosphoric acid | 5 |
|  | A-8 | a | OL-K | RDDSN | 0.2 | condition 7 | 200 | 150 | phosphoric acid | 5 |
|  | A-9 | a | OL-K | RDDSN | 0.2 | condition 8 | 200 | 150 | phosphoric acid | 5 |
|  | A-10 | b | TFK | RDDSN | 0.2 | condition 9 | 180 | 145 | sulfuric acid | 1 |
|  | A-11 | b | TFK | RDDSN | 0.2 | condition 3 | 180 | 145 | sulfuric acid | 1 |
|  | A-12 | b | TFK | RDDSN | 0.2 | condition 3 | 180 | 145 | sulfuric acid | 1 |
|  | A-13 | b | TFK | RDDSN | 0.15 | condition 3 | 180 | 145 | sulfuric acid | 1 |
|  | A-14 | b | TFK | RDDSN | 0.3 | condition 3 | 180 | 145 | sulfuric acid | 1 |
|  | A-15 | b | TFK | DSN | 0.13 | condition 3 | 180 | 145 | hydrochloric acid | 1 |
|  | A-16 | c | TFN | DBSN | 0.2 | condition 3 | 180 | 145 | acetic acid | 10 |
|  | A-17 | c | TFN | DRSSN | 0.25 | condition 3 | 180 | 145 | methacrylic acid | 10 |
| Comparative Example | A-18 | a | OL-K | RDDSN | 0.2 | condition 1 | 233 | 280 | phosphoric acid | 5 |
|  | A-19 | a | OL-K | RDDSN | 0.2 | condition 2 | 156 | 200 | phosphoric acid | 5 |
|  | A-20 | a | OL-K | RDDSN | 0.2 | condition 3 | 180 | 220 | phosphoric acid | 5 |
|  | A-21 | a | OL-K | RDDSN | 0.2 | condition 4 | 450 | 500 | phosphoric acid | 5 |
|  | A-22 | a | OL-K | RDDSN | 0.2 | condition 5 | 270 | 300 | phosphoric acid | 5 |
|  | A-23 | a | OL-K | RDDSN | 0.2 | condition 6 | 300 | 350 | phosphoric acid | 5 |
|  | A-24 | a | OL-K | RDDSN | 0.2 | condition 8 | 200 | 250 | phosphoric acid | 5 |
|  | A-25 | a | OL-K | RDDSN | 0.2 | condition 9 | 200 | 250 | phosphoric acid | 5 |
|  | A-26 | a | OL-K | RDDSN | 0.2 | condition 1 | 233 | 150 | phosphoric acid | 5 |
|  | A-27 | a | OL-K | not used |  | condition 1 | 233 | 150 | phosphoric acid | 5 |
|  | A-28 | b | TFK | RDDSN | 0.2 | condition 10 | 180 | 220 | sulfuric acid | 1 |
|  | A-29 | b | TFK | RDDSN | 0.2 | condition 3 | 180 | 145 | sulfuric acid | 1 |

|  | Particles-enlarged latex | Coagulant | | Neutralizing agent | | | Scale % | Solid content of latex % | Average particle diameter $\mu$m | Amount of particle of 0.15 $\mu$m or less % | pH |
|---|---|---|---|---|---|---|---|---|---|---|---|
|  |  | Amount/ parts | pH | Kind | Concentration/% | Amount/ parts |  |  |  |  |  |
| Example | A-1 | 0.8 | 3 | KOH | 10 | 1.08 | 0.15 | 37 | 0.26 | 8 | 9.8 |
|  | A-2 | 0.8 | 3 | KOH | 10 | 1.08 | 0.1 | 37 | 0.26 | 8 | 9.8 |
|  | A-3 | 0.8 | 3 | KOH | 10 | 1.08 | 0.2 | 37 | 0.26 | 8 | 9.8 |
|  | A-4 | 0.8 | 3 | KOH | 10 | 1.08 | 0.05 | 37 | 0.26 | 8 | 9.8 |
|  | A-5 | 0.8 | 3 | KOH | 10 | 1.08 | 0.1 | 37 | 0.26 | 8 | 9.8 |
|  | A-6 | 0.8 | 3 | KOH | 10 | 1.08 | 0.2 | 37 | 0.26 | 8 | 9.8 |
|  | A-7 | 0.8 | 3 | KOH | 10 | 1.08 | 0.05 | 37 | 0.26 | 8 | 9.8 |
|  | A-8 | 0.8 | 3 | KOH | 10 | 1.08 | 0.1 | 37 | 0.26 | 8 | 9.8 |
|  | A-9 | 0.8 | 3 | KOH | 10 | 1.08 | 0.15 | 37 | 0.26 | 8 | 9.8 |
|  | A-10 | 0.25 | 4.5 | KOH | 10 | 0.39 | 0.15 | 33 | 0.21 | 10 | 9.8 |
|  | A-11 | 0.35 | 3 | KOH | 10 | 0.45 | 0.2 | 32 | 0.27 | 6 | 9.8 |
|  | A-12 | 0.4 | 2 | KOH | 10 | 0.51 | 0.15 | 31 | 0.35 | 4 | 9.8 |
|  | A-13 | 0.35 | 3 | KOH | 10 | 0.45 | 0.2 | 33 | 0.3 | 7 | 9.8 |
|  | A-14 | 0.35 | 3 | KOH | 10 | 0.45 | 0.05 | 33 | 0.21 | 5 | 9.8 |
|  | A-15 | 0.28 | 3 | KOH | 10 | 0.45 | 0.1 | 32 | 0.27 | 6 | 9.8 |
|  | A-16 | 1.2 | 3 | NaOH | 10 | 0.8 | 0.1 | 35 | 0.27 | 6 | 9.8 |
|  | A-17 | 1.6 | 3 | NaOH | 10 | 0.74 | 0.1 | 35 | 0.26 | 6 | 9.8 |
| Comparative Example | A-18 | 0.8 | 3 | KOH | 10 | 1.08 | 1.5 | 36 | 0.26 | 13 | 9.8 |
|  | A-19 | 0.8 | 3 | KOH | 10 | 1.08 | 1 | 36 | 0.26 | 12 | 9.8 |
|  | A-20 | 0.8 | 3 | KOH | 10 | 1.08 | 1.5 | 36 | 0.26 | 13 | 9.8 |
|  | A-21 | 0.8 | 3 | KOH | 10 | 1.08 | 2 | 35 | 0.26 | 15 | 9.8 |
|  | A-22 | 0.8 | 3 | KOH | 10 | 1.08 | 1.5 | 36 | 0.26 | 13 | 9.8 |

TABLE 1-continued

|      |      |   |     |    |      |              |    |      |    |     |
|------|------|---|-----|----|------|--------------|----|------|----|-----|
| A-23 | 0.8  | 3 | KOH | 10 | 1.08 | 1.2          | 36 | 0.26 | 14 | 9.8 |
| A-24 | 0.8  | 3 | KOH | 10 | 1.08 | 2            | 35 | 0.26 | 16 | 9.8 |
| A-25 | 0.8  | 3 | KOH | 10 | 1.08 | 1.5          | 36 | 0.26 | 13 | 9.8 |
| A-26 | 0.4  | 6 | KOH | 10 | 0.81 | 0.15         | 37 | 0.14 | 26 | 9.8 |
| A-27 | 0.8  | 3 | KOH | 10 | 1.08 | large amount |    |      |    |     |
| A-28 | 0.35 | 3 | KOH | 10 | 0.45 | 0.3          | 32 | 0.26 | 15 | 9.8 |
| A-29 | 0.2  | 6 | KOH | 10 | 0.26 | 0.1          | 34 | 0.13 | 35 | 9.8 |

OL-K: potassium oleate, TFK: pottasium salt of beef fallow acid, TFN: sodium salt of beef fallow acid, RDDSN: sodium salt of alkyl diphenyl ether disulfonic acid, DSN: sodium dodecyl sulfate, DBSN: sodium dodecylbenzene sulfonate, DRSSN: sodium dialkyl sulfosuccinate

TABLE 2

| | | Particles-enlarged latex | | | Graft monomer(s) | | | Graft copolymer | | Average particle | Izod impact | |
|---|---|---|---|---|---|---|---|---|---|---|---|---|
| | Kind | Amount of particles of 0.15 μm or less (%) | Composition (Bd/St) | Amount/ parts | 1st stage/ parts | 2nd stage/ parts | 3rd stage/ parts | Kind | Amount/ parts | diameter μm | [kg · cm/cm] | Laster |
| Example | A-11 | 6 | 70/30 | 70 | MMA(12) | St(15) | MMA(3) | B-1 | 5 | 0.29 | 72 | ○ |
| | A-11 | 6 | 70/30 | 70 | MMA(12) | St(15) | MMA(3) | B-1 | 10 | 0.29 | 110 | ○ |
| | A-11 | 6 | 70/30 | 70 | MMA(12) | St(15) | MMA(3) | B-1 | 20 | 0.29 | 121 | ○ |
| | A-11 | 6 | 70/30 | 60 | MMA(16) | St(20) | MMA(4) | B-2 | 10 | 0.3 | 97 | ○ |
| | A-11 | 6 | 70/30 | 80 | MMA(8) | St(10) | MMA(2) | B-3 | 10 | 0.28 | 113 | ○ |
| | A-11 | 6 | 70/30 | 70 | MMA/EA(9/3) | St(15) | MMA(3) | B-4 | 10 | 0.29 | 110 | ○ |
| | A-11 | 6 | 70/30 | 70 | St(3) | MMA(27) | | B-5 | 10 | 0.29 | 106 | ○ |
| | A-11 | 6 | 70/30 | 70 | MMA/St(5/25) | | | B-6 | 10 | 0.29 | 99 | ○ |
| | A-10 | 10 | 70/30 | 70 | MMA(12) | St(15) | MMA(3) | B-7 | 10 | 0.23 | 101 | ○ |
| | A-12 | 4 | 70/30 | 70 | MMA(12) | St(15) | MMA(3) | B-8 | 10 | 0.37 | 133 | ○ |
| | A-3 | 8 | 75/25 | 70 | MMA(12) | St(15) | MMA(3) | B-9 | 10 | 0.28 | 114 | ○ |
| | A-15 | 6 | 70/30 | 70 | MMA(12) | St(15) | MMA(3) | B-10 | 10 | 0.29 | 110 | ○ |
| | A-16 | 6 | 100/0 | 70 | MMA(12) | St(15) | MMA(3) | B-11 | 10 | 0.29 | 119 | ○ |
| | A-17 | 6 | 100/0 | 70 | MMA(12) | St(15) | MMA(3) | B-12 | 10 | 0.28 | 118 | ○ |
| | A-14 | 8 | 70/30 | 70 | MMA(12) | St(15) | MMA(3) | B-13 | 10 | 0.19 | 100 | ○ |
| Comparative | A-20 | 13 | 75/25 | 70 | MMA(12) | St(15) | MMA(3) | B-17 | 10 | 0.28 | 44 | ○ |
| | A-26 | 26 | 75/25 | 70 | MMA(12) | St(15) | MMA(3) | B-18 | 10 | 0.15 | 36 | ○ |
| | A-28 | 15 | 70/30 | 70 | MMA(12) | St(15) | MMA(3) | B-19 | 10 | 0.28 | 39 | ○ |
| | A-29 | 35 | 70/30 | 70 | MMA(12) | St(15) | MMA(3) | B-20 | 10 | 0.15 | 28 | ○ |

We claim:

1. A thermoplastic resin composition comprising:

70–99% by weight of a vinyl chloride monomer-containing thermoplastic resin (C) and 1–30% by weight of a graft copolymer (B) obtained by graft-polymerizing, in at least one stage, at least one monomer selected from the group consisting of an aromatic vinyl monomer, a (meth)acrylic acid ester monomer, an unsaturated nitrile monomer and a monomer copolymerizable therewith, onto a particles-enlarged diene monomer containing polymer rubber latex (A) having a number-average particle diameter of 0.15–0.5 μm, obtained by subjecting a diene monomer-containing polymer rubber latex produced by emulsion polymerization, to particles agglomeration and enlargement based mainly on Brownish coagulation, wherein said particles-enlarged diene monomer-containing polymer rubber latex (A) is contained in an amount of 55–85% by weight in terms of solid content based on said graft copolymer (B).

* * * * *

UNITED STATES PATENT AND TRADEMARK OFFICE
CERTIFICATE OF CORRECTION

PATENT NO. : 5,847,050
DATED      : December 8, 1998
INVENTOR(S): Akihiro TORITANI, et al.

It is certified that error appears in the above-identified patent and that said Letters Patent is hereby corrected as shown below:

On the title page, item [22] should be:

--[22]  PCT Filed:  Jul. 4, 1996--

Signed and Sealed this

First Day of June, 1999

Attest:

Q. TODD DICKINSON

*Attesting Officer*    *Acting Commissioner of Patents and Trademarks*